United States Patent
Tabakovic et al.

(10) Patent No.: US 7,102,855 B2
(45) Date of Patent: Sep. 5, 2006

(54) MICROELECTRONIC DEVICE WITH CLOSELY SPACED CONTACT STUDS

(75) Inventors: Ibro Tabakovic, Edina, MN (US); Ladislav L. Pust, Savage, MN (US); Arthur L. Thayer, Minnetonka, MN (US); Thu Van Nguyen, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 522 days.

(21) Appl. No.: 10/641,949

(22) Filed: Aug. 15, 2003

(65) Prior Publication Data

US 2005/0036238 A1    Feb. 17, 2005

(51) Int. Cl.
   *G11B 5/127* (2006.01)
(52) U.S. Cl. .................................. 360/234.5; 360/126
(58) Field of Classification Search ............. 257/741, 257/752, 759, 773, 774, 775; 360/125, 126, 360/234.5, 123; 438/626, 637, 638
See application file for complete search history.

(56) References Cited

U.S. PATENT DOCUMENTS

| | | | |
|---|---|---|---|
| 5,286,674 A | 2/1994 | Roth et al. ................ | 437/190 |
| 5,875,080 A | 2/1999 | Seagle ....................... | 360/123 |
| 6,122,149 A | 9/2000 | Zhang et al. ............ | 360/294.5 |
| 6,709,978 B1 * | 3/2004 | Geusic et al. .............. | 438/667 |
| 2001/0052773 A1 | 12/2001 | Heim et al. ................ | 324/210 |
| 2001/0053044 A1 | 12/2001 | Rea et al. ................... | 360/123 |
| 2002/0027750 A1 | 3/2002 | Shukh et al. .............. | 360/317 |
| 2002/0057531 A1 | 5/2002 | Segar et al. ............. | 360/234.5 |
| 2003/0039064 A1 | 2/2003 | Khizroev et al. ......... | 360/122 |

FOREIGN PATENT DOCUMENTS

| EP | 929100 A2 * | 7/1999 |
|---|---|---|
| JP | 10321977 A * | 12/1998 |

* cited by examiner

*Primary Examiner*—William J. Klimowicz
(74) *Attorney, Agent, or Firm*—Westman, Champlin & Kelly

(57) ABSTRACT

A microelectronic device includes a transducer. An overcoat layer is disposed on a transducer surface. A plurality of electrical contact pads are disposed on the overcoat layer. First and second studs that pass through the overcoat layer to connect the transducer to the electrical contact pads. The first and second studs are separated from one another by a reduced spacing distance that is free of trenching.

25 Claims, 8 Drawing Sheets

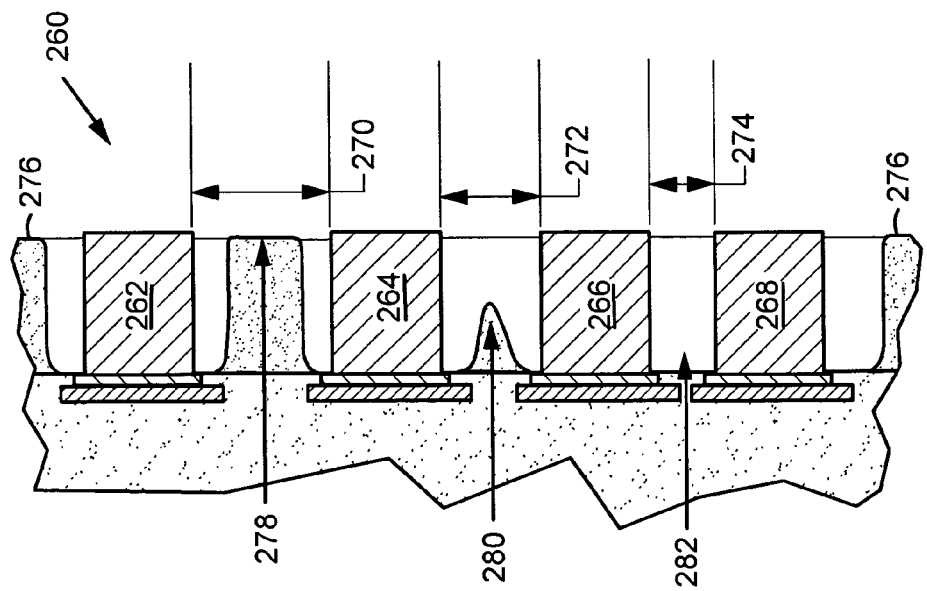
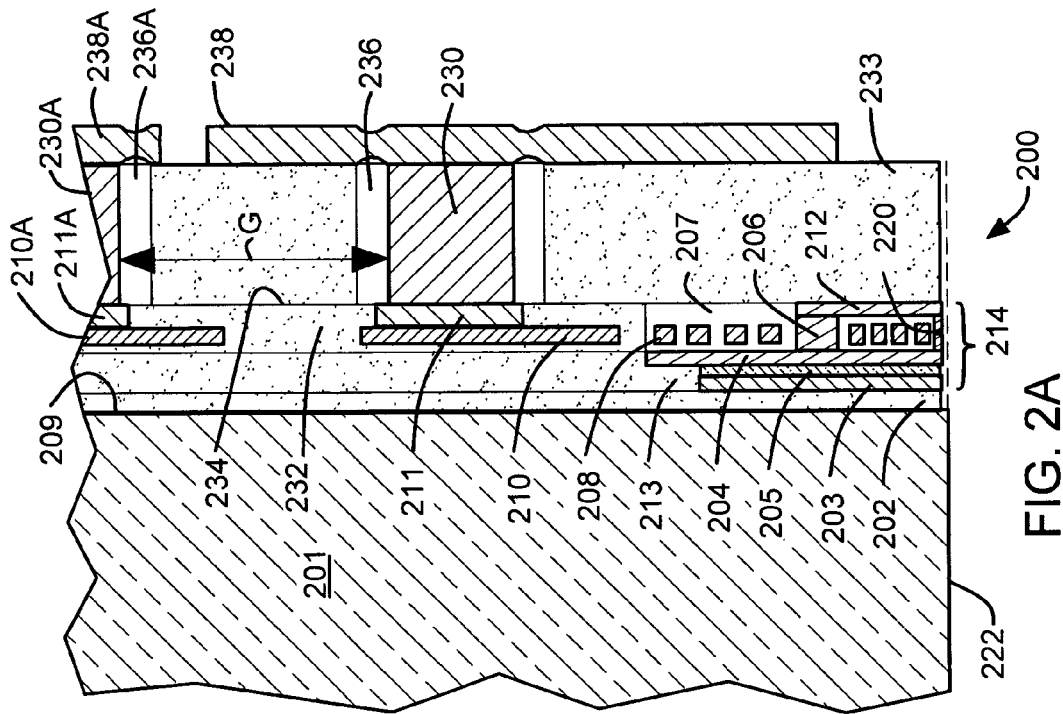
FIG. 2B
FIG. 2A

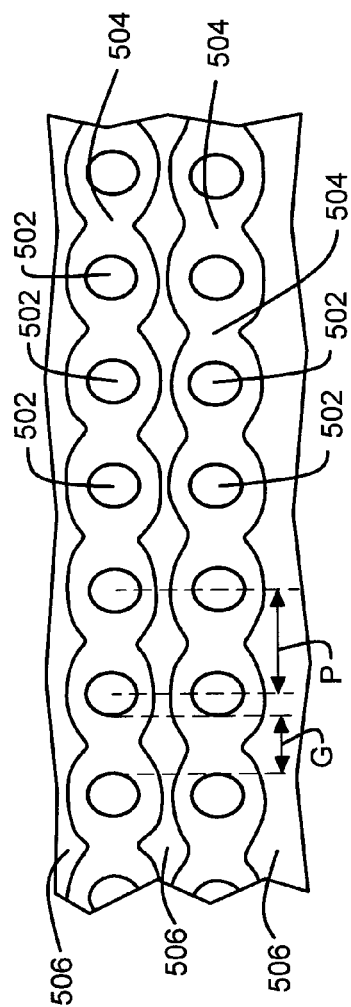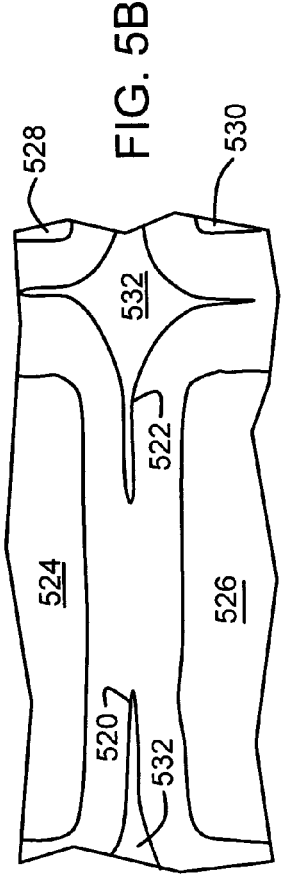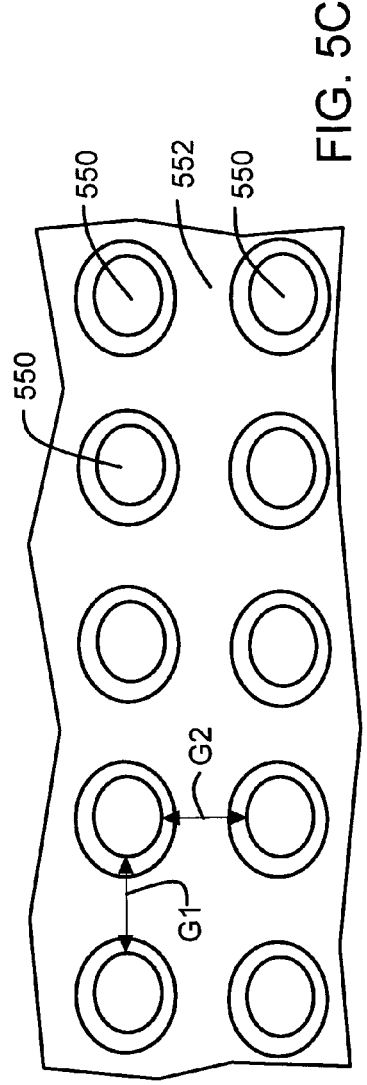
FIG. 5A
FIG. 5B
FIG. 5C

MICROELECTRONIC DEVICE WITH CLOSELY SPACED CONTACT STUDS

FIELD OF THE INVENTION

The present invention relates generally to transducers, and more particularly but not by limitation to read/write transducers for disc drives.

BACKGROUND OF THE INVENTION

In a typical thin film read/write transducer, active transducer components (a reader and a writer) are covered by a thick alumina overcoat layer. The alumina overcoat layer mechanically protects the transducer and allows mechanical assembly with suspension components and electrical leads without damage to the transducer. Metallic studs, typically formed of copper, pass through the thick overcoat layer and complete electrical connections between the transducer components and external bond pads that contact the electrical leads.

The studs are formed first, and then the thick alumina overcoat layer is deposited around the studs. One known problem with the alumina overcoat masking process is a defect called "trenching." When studs are placed close to one another, during the subsequent alumina deposition process, the mask tends to shield a space between the studs, resulting in a trench in the alumina layer in the space between the studs. The trench is a void in the overcoat layer that is not filled with alumina. When there is significant trenching, the trench tends to fill with debris during subsequent processing steps such as a chemical mechanical polishing (CMP) process. If trenching occurs, adjacent studs can be electrically shorted to one another and the read/write transducer becomes useless.

The temperature of the read/write transducer changes significantly during disk or tape drive operation. The studs are typically made of copper and have a larger coefficient of temperature expansion (TCE) that the thick alumina layer. As the read/write transducer heats up, the TCE mismatch of the studs can deform the head as well as the slider upon which the read/write head is deposited. This deformation includes both increased pole tip protrusion (Thermal-PTR) and slider bending (Cross-curve change). There is a desire to reduce the diameter of the studs in order to reduce bending and deformation.

As recording densities increase, read/write heads are being improved to integrate additional features such as fly height sensors and mechanical microactuators in the read/write head itself. There is a desire to provide read/write heads that have more studs for connections to these additional features while at the same time reducing the size of the read/write head so that there is less space available for the studs. As attempts are made to produce read/write transducers with smaller diameter, more closely spaced studs, problems with trenching and deformation due to thermal mismatch increase.

In existing read/write transducers, sliders are large and at the same time, the number of required electrical connections is low. This allows placing studs far enough from each other and from the read/write transducer to reduce thermo-mechanical interaction. Recent heads for high areal density are smaller and at the same time, the number of required electrical connections is increasing.

A method and apparatus for providing smaller diameter, more closely spaced studs on smaller read/write heads without high failure rates due to trenching and excessive distortion and bending. Embodiments of the present invention provide solutions to these and other problems, and offer other advantages over the prior art.

SUMMARY OF THE INVENTION

Disclosed are a microelectronic device and method for making such a device. The microelectronic device comprises a transducer having a transducer surface. An overcoat layer is disposed on the transducer surface. First and second electrical contact pads are disposed on the overcoat layer. First and second studs pass through the overcoat layer to connect the transducer to the first and second electrical contact pads. The first and second studs are separated from one another by a spacing distance that is free of trenching.

Other features and benefits that characterize embodiments of the present invention will be apparent upon reading the following detailed description and review of the associated drawings.

BRIEF DESCRIPTION OF THE DRAWINGS

FIG. 2A illustrates a cross-sectional view of a read/write head that includes studs.

FIG. 2B is a cross-sectional view illustrating trenching of an overcoat layer between studs as a function of stud spacing.

FIG. 5A illustrates a plan view of oval studs spaced apart by a pitch distance P and exhibiting significant trenching.

FIG. 5B illustrates a plan view of partial trenching between rectangular studs.

FIG. 5C illustrates a plan view of studs that are free of trenching.

DETAILED DESCRIPTION OF ILLUSTRATIVE EMBODIMENTS

Disclosed is a microelectronic component with a plurality of studs passing through an overcoat layer on a surface of a transducer. The overcoat layer can be subject to a problem of trenching when a spacing between studs is too small in relation to the processes used to deposit the overcoat layer. The transducer can be also be subject to undesired temperature effects from differences in temperature coefficients of materials in the microelectronic device. These problems are exacerbated in read/write heads by trends toward smaller heads and more contacts to accommodate more complex transducers. These problems are overcome by a combination of adjusting processes, size, spacing or materials of the studs as described below in connection with FIGS. 1–8.

Figure 1:
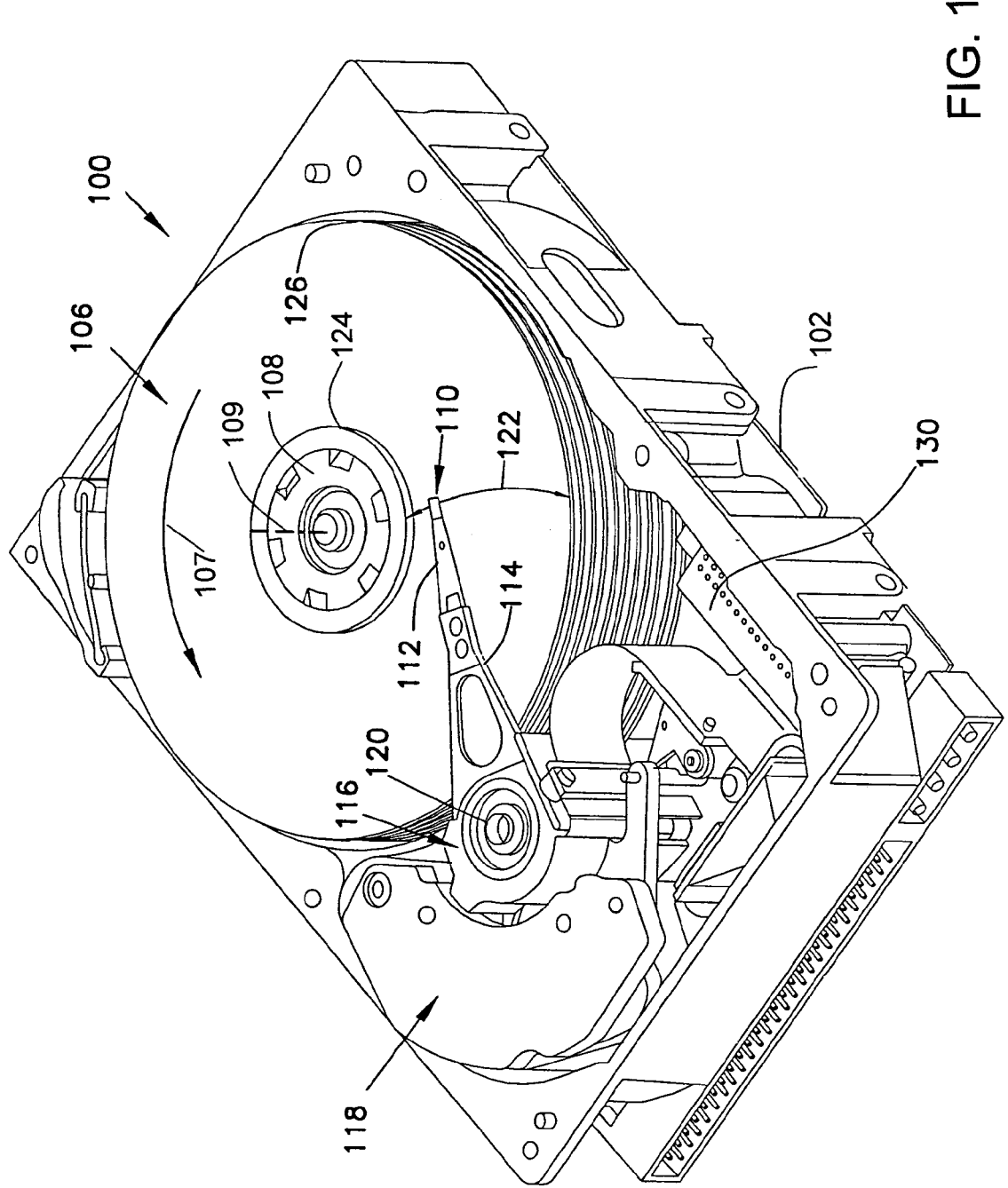
FIG. 1 is an isometric view of a disc drive.

FIG. 1 illustrates an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown).

FIG. 2A schematically illustrates a partial cross-section of a head 200 for a disc drive. Head 200 includes a thin film read/write transducer 214 with gaps and other internal dimensions adapted for areal densities of 20 gigabits/square inch or more. The transducer 214 is deposited on a substrate 201 and transduces electrical signals. The portion of head 200 that is illustrated in cross-section in FIG. 2A is near the trailing side 209 of the substrate 201 along a central plane perpendicular to an air bearing surface 222 of the head 200.

The substrate 201 is preferably formed from an electrically conducting ceramic material, such as a mixture of aluminum oxide ($Al_2O_3$) and titanium carbide (TiC), referred to in this application as "AlTiC". A basecoat material 202 is deposited on the trailing side 209 of substrate 201. The basecoat material 202 is an electrically insulating material, typically $Al_2O_3$, with a CTE close to that of substrate 201.

Deposited metallic magnetic layers from alloys of iron (Fe), nickel (Ni), or cobalt (Co) form a lower shield 203, shared pole 204, top pole 212 and a core 206. Core 206 completes a write magnetic circuit through the center of a coil 208 and through a pole tip 220 at the air bearing surface 222. The metallic magnetic layers 203, 204, 212, 206 typically have a large coefficient of thermal expansion (CTE), e.g. magnetic alloy $Ni_{80}Fe_{20}$ with a CTE of about $12 \times 10^{-6}/°C$.

The write coil 208 in the transducer 214 is preferably made from copper with $CTE = 16.5 \times 10^{-6}/°C$. or from another highly electrically conducting metal or alloy. A coil insulator 207 is typically formed from a cured photoresist with large CTE, similar to or even larger than the CTE of the metallic magnetic layers 203, 204, 212, 206 and the CTE of the write coil 208.

An additional deposited insulating layer 213 fills the space around lower shield 203, and shared pole 204. Layer 213 is typically made from $Al_2O_3$. A read sensor 205 is formed in a very thin layer between lower shield 203 and shared pole 204. Read sensor 205 is typically a magnetoresistive (MR) or giant magnetoresistive (GMR) sensor.

An outer turn of the coil 208 ends in a wider coil end 210. A lead from the read sensor 205 is connected to a metal pad 210A. A first seed layer 211 is deposited on the coil end 210, and a second seed layer 211A is deposited on the metal pad 210A. The seed layers 211, 211A, the coil end 210 and the metal pad 210A are embedded in an alumina layer 232. The alumina layer 232 has an outwardly facing surface 234 that is referred to herein as transducer surface 234. The transducer surface 234 marks a outer boundary of layers that include transducer components. The seed layers 211, 211A are typically deposited by sputtering. The seed layers 211, 211A serves as growth sites for electrodeposition of a first stud 230 and a second stud 230A. The first stud 230 is spaced a distance G apart from the second stud 230A as illustrated. The studs 230, 230A are preferably formed of the same material as the seed layers 211, 211A. In one preferred arrangement, the seed layers 211, 211A and the studs 230, 230A are formed of copper. In another preferred arrangement, the seed layers 211, 211A and the studs 230, 230A are formed of a nickel iron alloy.

An insulating overcoat or topcoat layer 233 is deposited on top of the transducer surface 234. The overcoat layer 233 is typically also made from $Al_2O_3$ with a CTE close to that of the substrate 201. The overcoat layer 233 is masked near studs 230, 230A, leaving annular spaces 236, 236A surrounding the studs 230, 230A, respectively. The overcoat layer 233 is planarized after deposition over overcoat layer 233 to expose the tops of studs 230, 230A. Contact pads 238, 238A are then deposited on the overcoat layer 233. The contact pad 238, 238A make electrical contact with the studs 230, 230A and provides a surface for electrical connection to external circuits by wire bond, ball bond or other known bonding methods. In a preferred arrangement, the contact pad 238, 238A are formed of gold.

The head 200 includes multiple studs such as stud 230, 230A in order to make needed connections to the read head 205 and the write coil 208 and also other transducers such as electrical lap gages, fly height sensors or fly height actuators (not illustrated in FIG. 2A). As the size of read/write heads becomes smaller and the number of studs increases to provide increasingly complex transducer functions on read/write heads, the studs 230 become crowded close to one another as described below in connection with FIG. 2B.

FIG. 2B illustrates a test sample 260 upon which multiple studs 262, 264, 266 and 268 have been deposited with varying spacings 270, 272, 274 between the studs as illustrated. The test sample 260 is prepared using substantially the same processes that are used to deposit the stud 230 in FIG. 2A. When an overcoat layer 276 is deposited and planarized, it is found that, with the wide spacing 270 between studs 262, 264, the overcoat layer 276 reaches full height in the wide spacing 270 and is free of trenching as illustrated at 278. It is found that, with the intermediate spacing 272 between studs 264, 266, the overcoat layer 276 does not reach full height in the spacing 272 and is subject to partial trenching as illustrated at 280. It is found that, with the narrow spacing 274 between studs 266, 268, the overcoat layer 276 is absent in the spacing 274 and is subject to complete trenching as illustrated at 282. The trenching is a defect that causes head failure, and thus the minimum spacing needed to prevent trenching represents a design barrier to increasing the density of studs. It is found that the spacing at which trenching will occur depends on the size of the stud and also on the process used to deposit the overcoat layer 276. In particular trenching is sensitive to the type of resist used for masking.

Processes used to make the studs typically include several steps. First, seed layers are deposited to provide a site for deposition of the studs. The seed layers are typically formed of the same material as the studs. Next, the studs are electrodeposited on the seed layer starting with application of a laminate (dry) or coat (wet) photoresist to provide a multifeature mask that define the locations of the studs. The photoresist is exposed and developed.

Next, the studs are plated. Small circular Copper studs can be produced by electrodeposition from plating bath containing 0.3 Molar $CuSO_4$, 1.8 Molar $H_2SO_4$, 50 ppm NaCl, 30–50 micromolar PEG and 2–10 micromolar DPS using the current density from 10 to 30 mA per square cm at 20–25 degrees Centigrade in the cell with reciprocating paddle (0.6–1.0 cycle per second).

After plating is complete, the photoresist is stripped off and the copper is wet etched. After the studs are complete the overcoat layer is applied at a thickness that is typically 30–50 micrometers. The overcoat and studs are then lapped to the final height, typically 15–40 micrometer.

Size, shape, and pitch of prior art studs are limited by the used process (photo, plating, and overcoat/lapping). Dry negative Aquamer photoresist requires minimum stud dimensions (for example: 40×100 micrometer) and minimum stud separation (for example: 90 micrometer) to completely avoid trenching in the Alumina overcoat. It is found, however, that this dimensional limitation of the prior art can be overcome using a positive or negative thick film (wet or dry) photoresist. Such thick film photoresists are capable of forming high resolution, high aspect ratio imaging, with the additional advantage of facile removal in common photoresist formulations. Dry Aquamer SF or a wet photoresist such as JSR-THB-28 or a positive photoresist such as AZ 4260 can be used to enable formation of studs with diameters down to 30 micrometers and spacing down to 50 micrometers without trenching.

Figure 3:
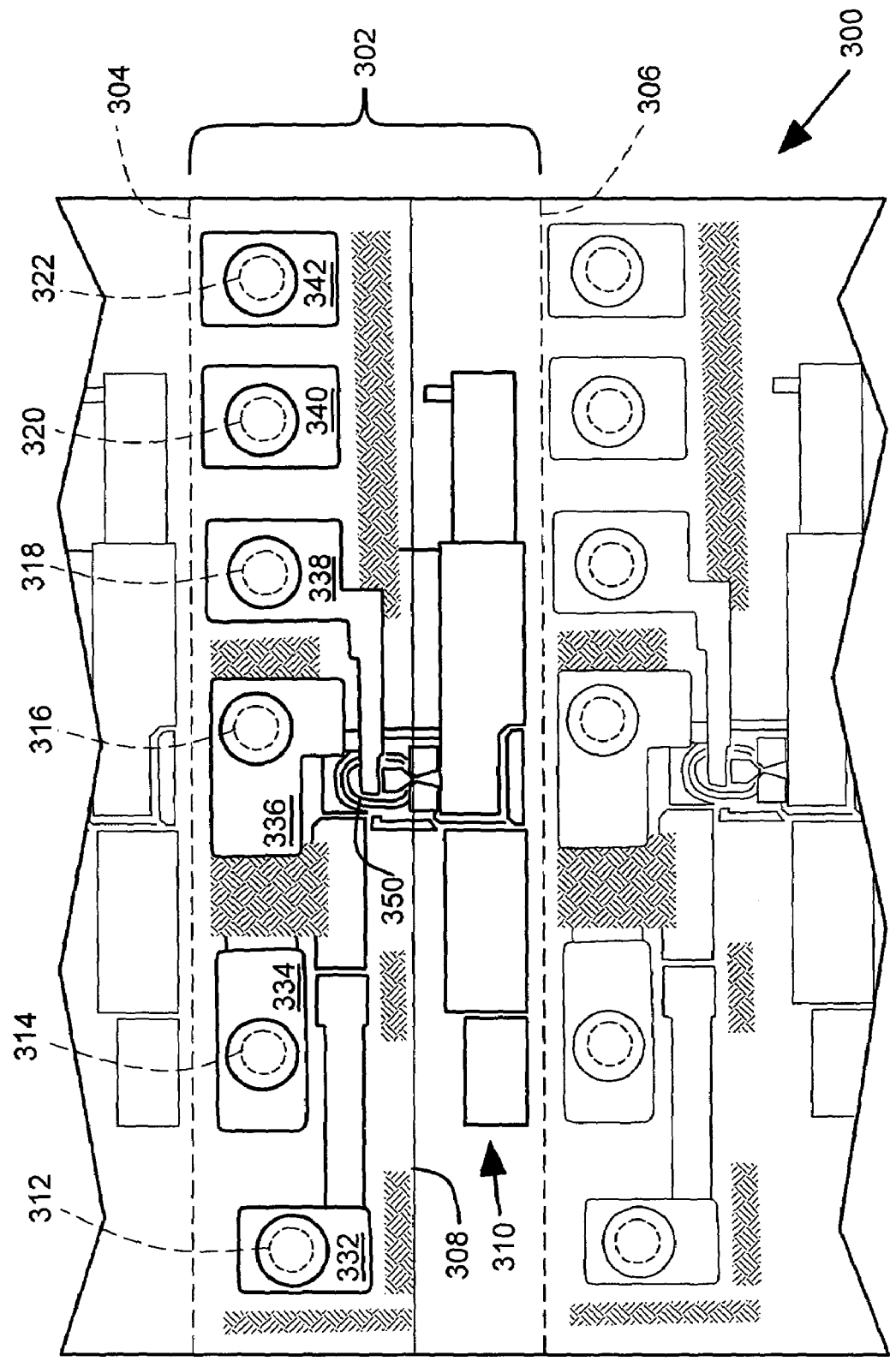
FIG. 3 illustrates a partial view of a bar with multiple read/write heads prior to separation of the bar into individual read/write heads.

FIG. 3 illustrates a bar 300 of substrate material upon which multiple read/write heads such as read/write head 302 are deposited in a step and repeat pattern. The bar 300 is an intermediate, in-process component which is later cut into individual heads (along dashed lines 304, 306). The individuals heads are later lapped to a lap line 308. Features 310 that are below the lap line 308 are used in processes used to deposit the head, but are removed from the finished read/write head after the lapping in complete. The read/write head 302 includes studs 312, 314, 316, 318, 320, 322. Each of these studs is in electrical contact with a transducer lead end (not illustrated) in the read/write head, and also in contact with one of electrical contact pads 332, 334, 336, 338, 340, 342 as illustrated. The read/write head 302 includes multiple transducers such as write coil 350 and a read head (not illustrated). The number of studs and contact pads shown in FIG. 3 is exemplary only, and additional studs and contact pads can be provided for other transducers on the read/write head 302 such as a fly height sensor, a microactuator, or both.

Figure 4B:
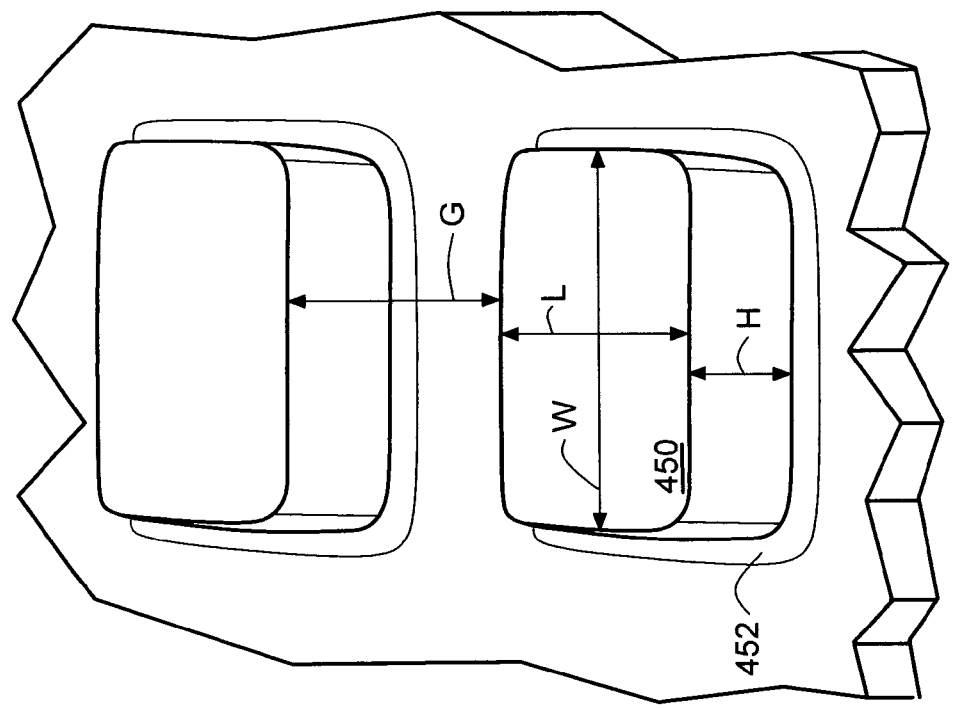
FIG. 4B illustrates a generally rectangular stud on a seed layer prior to alumina deposition.
Figure 4A:
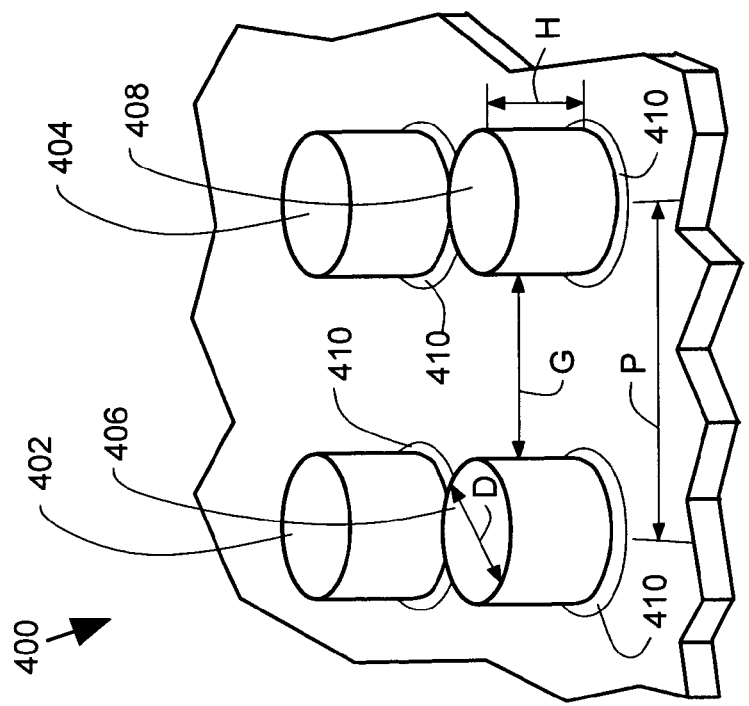
FIG. 4A illustrates an array of circular studs on seed layers prior to alumina deposition.

FIG. 4A illustrates an oblique view of an array 400 of circular cylindrical studs 402, 404, 406, 408 prior to deposition of an overcoat layer (not illustrated). Each of the circular studs 402, 404, 406, 408 has a diameter D and is separated from its nearest adjacent studs by a spacing or gap G. Each of the circular studs 402, 404, 406, 408 has a height H. The circular studs 402, 404, 406, 408 are centered on lines that are spaced apart by a pitch P. Each of the circular studs 402, 404, 406, 408 is deposited on an individual seed layer 410 on a read/write head as illustrated. In a preferred arrangement, the diameter D is 40 micrometers, the height H is 30 micrometers, and the pitch P is 90 micrometers.

FIG. 4B illustrates a generally rectangular stud 450 prior to deposition of an overcoat layer (not illustrated). The rectangular stud 450 is deposited on a seed layer 452. The rectangular stud 450 has a width W, a length L and a height H as illustrated. Rectangular studs such as rectangular stud 450 can be arranged in an array (similar to array 400) with a pitch in each direction adjusted to provide the same spacing or gap G between each stud and studs that are adjacent thereto. In a preferred arrangement, the length L is 80 micrometers, the width W is 60 micrometers, the height H is 30 micrometers and the gap G is 50 micrometers.

FIG. 5A illustrates an array of multiple oval studs 502 spaced apart by a pitch distance P with significant trenching at locations 504. In the arrangement illustrated, the oval studs 502 have a major diameter of 40 micrometers and a minor diameter of 20 micrometers, with a spacing or gap G of 30 micrometers and a pitch P of 50 micrometers. As illustrated in FIG. 5A there is significant trenching at locations 504 in an overcoat layer 506 using prior art methods. When improved processes described herein are used for deposition of the alumina layer 506, then the trenching shown at 504 is eliminated.

FIG. 5B illustrates partial trenching of an overcoat layer 532 at locations 520, 522 in between an array of rectangular studs 524, 526, 528, 530. In a preferred arrangement, the rectangular studs have length L and width W of 50 micrometers each, and a spacing G of 50 micrometers. When improved processes described herein are used for deposition of the alumina layer 532, then the trenching shown at 520, 522 is eliminated and there is a continuous wall of alumina layer 532 surrounding the studs 524, 526, 528, 530.

FIG. 5C illustrates studs 550 that are surrounded by an overcoat layer 552 that is free of trenching in gaps G1 and G2 between the studs 550. In a preferred arrangement, the studs 550 have diameter of 40 micrometers and the gaps G1 and G2 are 50 micrometers each. The arrangement shown in FIG. 5C is made free of trenching using improved processes described herein.

Figure 6:
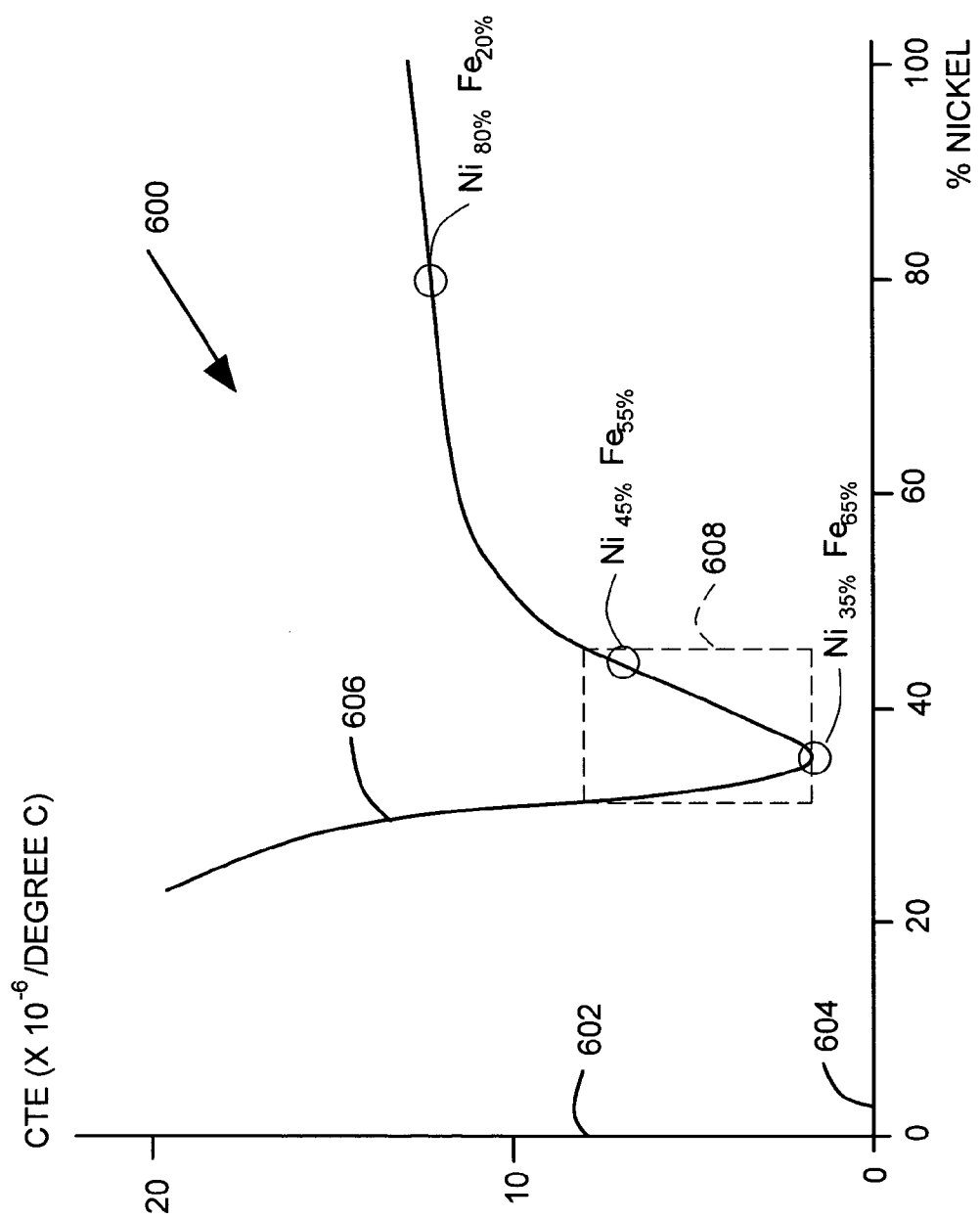
FIG. 6 illustrates a graph showing coefficient of temperature expansion as a function of percentage nickel in a nickel-iron alloy.

FIG. 6 illustrates a graph 600 showing coefficient of temperature expansion as a function of percentage of nickel in nickel-iron alloys of various compositions. In FIG. 6, a vertical axis 602 represents a coefficient of temperature expansion $\times 10^{-6}$ per degree Centigrade, and a horizontal axis 604 represents a percentage of nickel in a nickel-iron alloy. At the left side of the graph 600, an alloy is 100% iron, and at the right side of the graph an alloy is 100% nickel. A characteristic curve 606 illustrates the temperature coefficient of expansion for various nickel-iron alloys in the range of about 20%–100% nickel. As illustrated at 608, there is a range of alloys with nickel percentages between about 30% nickel and 45% percent nickel that have preferred low temperature coefficients of expansion in the range of about 1.7 to $8 \times 10^{-6}$ per degree Centigrade.

Figure 7:
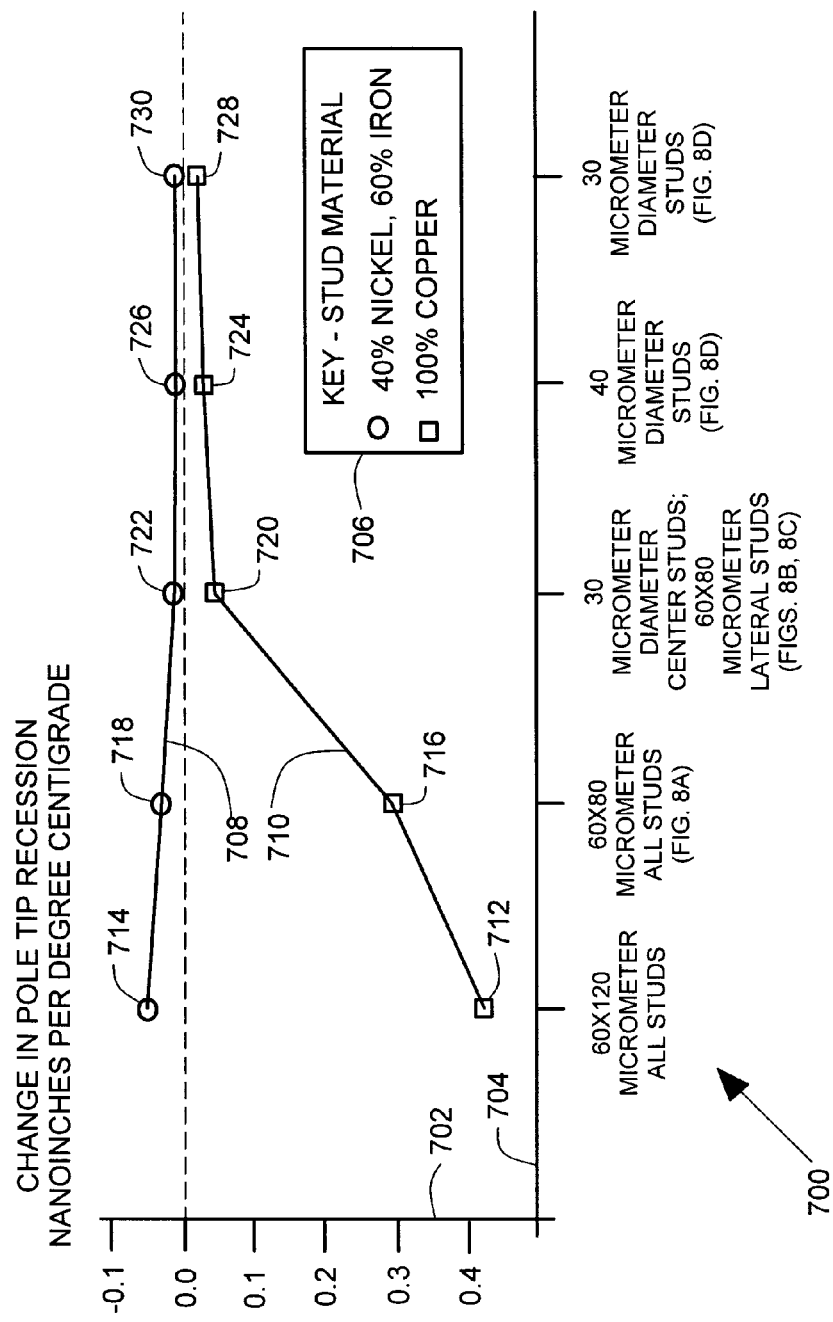
FIG. 7 illustrates a graph of contributions to thermal pole tip recession (TPTR) as a function of stud material, stud sizes and stud patterns.

FIG. 7 illustrates a graph 700 of changes in thermal pole tip recession (delta TPTR values) as a function of various combinations of stud material, stud sizes and stud patterns. A vertical axis 702 represents change in thermal pole tip recession in nanoinches per degree centigrade. A horizontal axis 704 sets forth the various combinations arranged in order of improving performance of pole tip recession. As indicated by key 706, a first characteristic curve 708 represents performance with studs that are formed from an iron-nickel alloy of 40% nickel and 60% iron, with circles indicating a result for each combination tested. As further indicated by key 706, a second characteristic curve 710 represents performance with studs that are formed from 100% copper, with squares indicating a result for each combination tested.

A first data point 712 represents performance of a PRIOR ART arrangement with 60×120 micrometer rectangular studs made from copper. A second data point 714 represents performance of an arrangement with 60×120 micrometer rectangular studs made of the nickel-iron alloy.

Data points 716 and 718 represent performance of an arrangement of 60×80 micrometer studs as described below in connection with FIG. 8A. Data points 720 and 722 represent performance of arrangements of both round and rectangular studs as described below in connection with FIGS. 8B–8C. Data points 724 and 726 represent performance of an arrangement of 40 micrometer diameter round studs illustrated in FIG. 8D. Data points 728 and 730 represent performance of an arrangement of 30 micrometer diameter round studs illustrated in FIG. 8D.

Figure 8B:
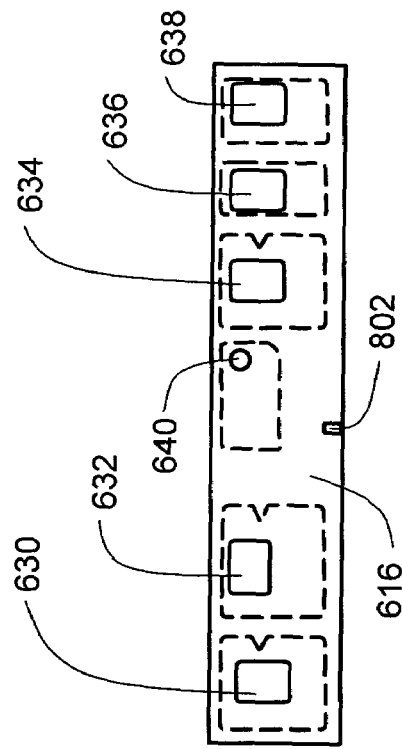
FIGS. 8A–8D illustrates various arrangements of studs in relation to a read/write head 802 on a trailing side of a slider.
Figure 8D:
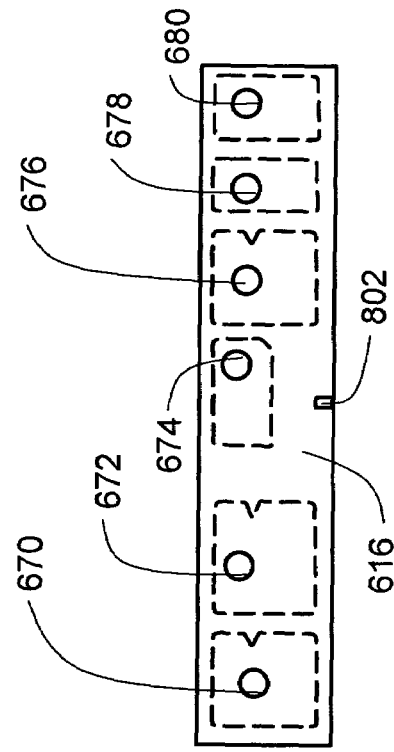
Figure 8A:
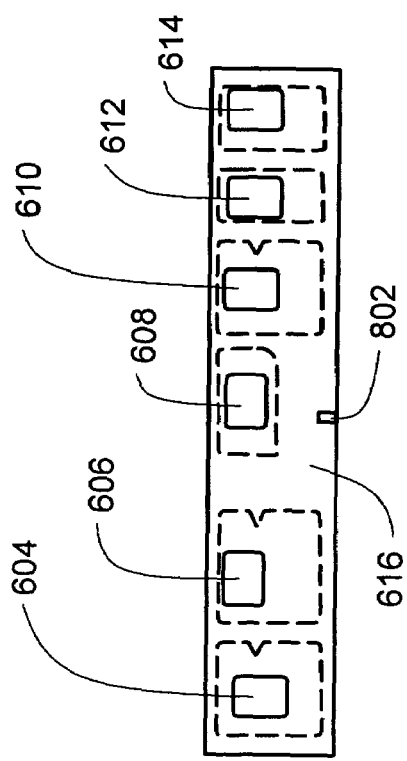
Figure 8C:
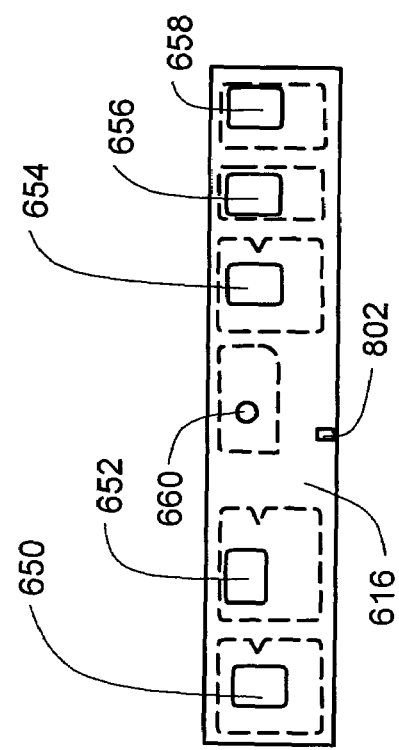

FIGS. 8A–8D illustrate arrangements of studs in relation to a read/write head 802 on a trailing side of slider. Positions and shapes of a electrical contact pads are illustrated in dashed lines in FIGS. 8A–8D. In FIG. 8A, there are multiple 60×120 micrometer rectangular studs 604, 606, 608, 610, 612, 614 arranged on the trailing side 616, and in particular a central stud 608 that is closest to the read/write head 802 is a rectangular stud. In FIG. 8B, there are multiple 60×120 micrometer rectangular lateral studs 630, 632, 634, 636, 638, and there is a central stud 640 that is round and has a diameter of 30 micrometers. In FIG. 8C, there are multiple 60×120 micrometer rectangular lateral studs 650, 652, 654, 656, 658, and there is a central stud 660 that is round and has a diameter of 30 micrometers. The round stud 660 in FIG. 8C is closer to read/write head 802 than the round stud 640 of FIG. 8B. In FIG. 8D there are multiple round studs 670, 672, 674, 676, 678 and 680 arranged around the read/write head 802. As can be seen by inspection of FIG. 7 in connection with FIGS. 8A–8D, thermal pole tip recession improves (i.e., approaches zero) as the stud material is changed from copper to a preferred nickel-iron alloy with 40% nickel and 60% iron. Thermal pole tip recession also improves as the size of the stud is reduced, and in particular reduction in size of the central stud nearest the read/write head 802 is important.

In summary, a microelectronic device (such as 200) comprises a transducer (such as 214) transducing an electrical signal and having a transducer surface (such as 234). An overcoat layer (such as 233) is disposed on the transducer surface. First and second electrical contact pads (such as 238, 238A) are disposed on the overcoat layer. First and second studs (such as 230, 230A) pass through the overcoat layer to connect the transducer to the first and second electrical contact pads. The first and second studs are separated from one another by a spacing distance (such as G) that is free of trenching.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the microelectronic device while maintaining substantially the same functionality without departing from the scope of the present invention. In addition, although the preferred embodiment described herein is directed to a read/write transducer for a disc drive, it will be appreciated by those skilled in the art that the teachings of the present invention can be applied to other microelectronic devices such as microactuators and fly height sensors, without departing from the scope of the present invention.

What is claimed is:

1. A microelectronic device, comprising:
   a transducer having a transducer surface;
   an overcoat layer adjacent the transducer surface;
   first and second electrical contact pads adjacent the overcoat layer; and
   first and second studs that pass through the overcoat layer to connect the transducer to the first and second electrical contact pads, the first and second studs being separated from one another by a spacing distance that does not exceed 50 micrometers that is free of trenching.

2. The microelectronic device of claim 1 wherein the first and second studs comprise an alloy of nickel and iron.

3. The microelectronic device of claim 2 wherein the alloy comprises 32–45% nickel.

4. The microelectronic device of claim 3 wherein the alloy has a coefficient of temperature expansion of no more than $8 \times 10^{-6}$ per degree Centigrade.

5. The microelectronic device of claim 3 wherein the alloy is substantially 40% nickel and 60% iron.

6. The microelectronic device of claim 1 wherein at least one of the first and second studs has a round cylindrical shape with a diameter of less than 40 micrometers.

7. The microelectronic device of claim 6 wherein the first and second studs have a height of less than 40 micrometers.

8. The microelectronic device of claim 6 wherein the first stud has a diameter of less than 40 micrometers, the spacing distance is less than 50 micrometers.

9. The microelectronic device of claim 1 wherein the transducer comprises a read/write head.

10. The microelectronic device of claim 1 wherein the transducer comprises first and second seed layers underlying the first and second studs, respectively.

11. A microelectronic device, comprising:
    a transducer having a transducer surface;
    an overcoat layer adjacent the transducer surface;
    at least two of electrical contact pads adjacent the overcoat layer; and
    first and second studs that electrically connect the transducer to the electrical contact pads, at least one of the first and second studs having a diameter limit that does not exceed 40 micrometers, and the first and second studs being separated from one another by a spacing distance limit that does not exceed 50 micrometers, the diameter limit and the spacing distance limit being set to prevent trenching.

12. The microelectronic device of claim 11 wherein the first and second studs are formed of copper.

13. The microelectronic device of claim 11 wherein the first and second studs are formed of an alloy of nickel and iron.

14. The microelectronic device of claim 11 wherein the spacing distance is free of trenching.

15. The microelectronic device of claim 11 wherein the first and second studs have a height of less than 30 micrometers.

16. The microelectronic device of claim 11 wherein the transducer comprises a read/write head.

17. The microelectronic device of claim 11 wherein the transducer comprises first and second seed layers underlying the first and second studs, respectively.

18. A process of manufacturing a microelectronic device, comprising:
- providing a transducer having a transducer surface;
- depositing first and second studs separated by a spacing distance on the transducer surface to provide electrical feedthroughs for the transducer;
- depositing an overcoat layer on the transducer surface surrounding the first and second studs;
- depositing a first and second electrical contact pads on the overcoat layer contacting the first and second studs, respectively;
- sizing the first stud to have a maximum cylindrical diameter of less than 40 micrometers;
- sizing the spacing distance at less than 50 micrometers such that the overcoat layer is free of trenching in the spacing distance.

19. The process of claim 18, further comprising:
forming the first and second studs from copper.

20. The process of claim 18, further comprising:
forming the first and second studs from an alloy of nickel and iron.

21. The process of claim 18, further comprising:
forming first and second seed layers underlying the first and second studs.

22. A microelectronic device, comprising:
- a transducer having a transducer surface;
- an overcoat layer disposed on the transducer surface;
- first and second electrical contact pads disposed on the overcoat layer; and
- first and second studs that pass through the overcoat layer to connect the transducer to the first and second electrical contact pads, the first and second studs being disposed on seed layers comprising the same material as the first and second studs, the first and second studs being separated from one another by a spacing distance that does not exceed 50 micrometers that is free of trenching.

23. The microelectronic device of claim 22 wherein the first and second studs comprise an alloy of nickel and iron.

24. The microelectronic device of claim 22 wherein in least one of the seed layers is disposed on a metal pad that is part of the transducer.

25. The microelectronic device of claim 22 wherein the transducer comprises a read/write head disposed on a slider substrate.

* * * * *